P. KENNEDY, Jr. & A. B. DISS.
Car-Couplings.

No. 135,714.  Patented Feb. 11, 1873.

UNITED STATES PATENT OFFICE.

PATRICK KENNEDY, JR., AND ALBERT B. DISS, OF WATERTOWN, NEW YORK.

IMPROVEMENT IN CAR-COUPLINGS.

Specification forming part of Letters Patent No. 135,714, dated February 11, 1873.

*To all whom it may concern:*

Be it known that we, PATRICK KENNEDY, Jr., and ALBERT B. DISS, of Watertown, in the county of Jefferson and State of New York, have invented a new and Improved Car-Coupling, of which the following is a specification:

Our invention is an improvement in devices for supporting the coupling-link so that it will enter the draw-head of the opposite car; and it consists in the arrangement of the bent or curved lever to which the hook for supporting the link is attached, so that it will be thrown upward when two cars meet, as hereinafter described.

Figure 1:
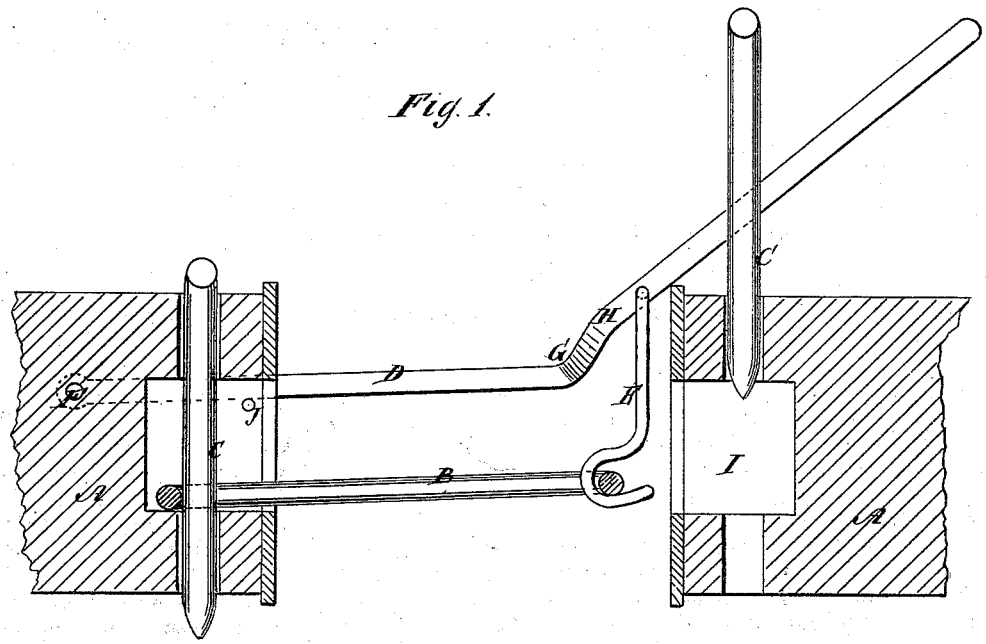
Figure 2:
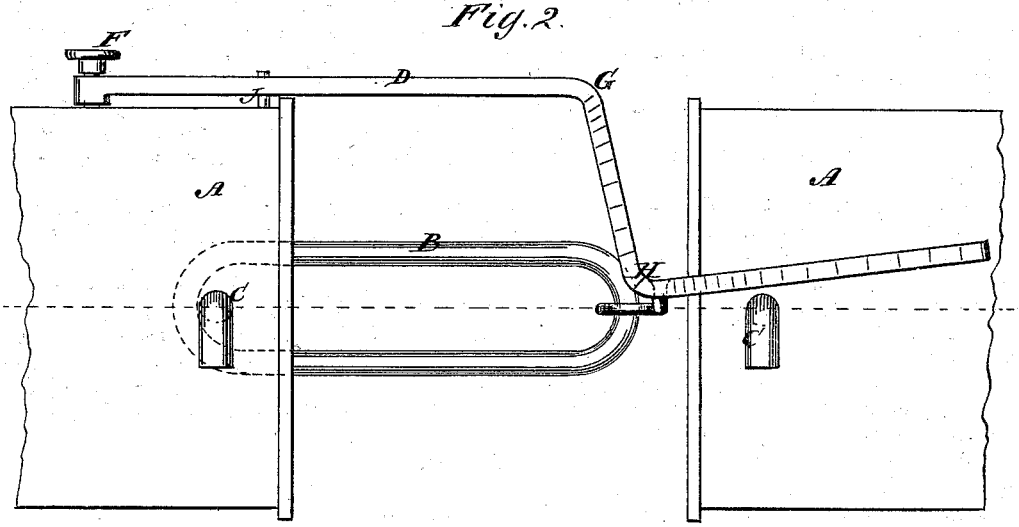

Figure 1 is a longitudinal sectional elevation of the draw-heads of a couple of cars, showing the application of our contrivances; and Fig. 2 is a plan view.

Similar letters of reference indicate corresponding parts.

A represents the draw-head; B, the coupling-link; and C, the pins of the ordinary car-coupling apparatus. D represents the lever, and E the hook of our attachment. This lever is pivoted either permanently or temporarily to one side of the draw-head, as shown at F, extends therefrom in about the plane of the side of said head about as far as the link extends, then bends around at G in front of the end of the draw-head, and extends about to the middle at H; then turns forward again and inclines upward, as represented in Fig. 1, so that, being prevented by a pin or other device at J from falling at the outer end as low as the top of the draw-head of the opposite car, it will be received by the latter on the upper corner when the cars to be coupled run together, and be raised thereby. Near the bend at H, and a little in advance of it, the hook E is suspended from this lever, so as to engage the outer end of the link and hold it ready for coupling with the approaching car. The hook is of such length that, when the end of the draw-head reaches it, it will have raised the link high enough to enter the socket I for coupling, and by the time the link begins to enter the socket the draw-head pushes the hook back and disengages it from the link; then the pin, being previously properly set in the top of its hole, as is now customary, will be jarred off its rest by the striking of the draw-heads together, and falling down will complete the coupling.

Having thus described our invention, we claim as new and desire to secure by Letters Patent—

The lever D, pivoted to the draw-head, supported by a suitable projection thereof, and bent or curved upward at its front end, in combination with the hook E and link B, as shown and described, to operate as specified.

PATRICK KENNEDY, JR.
ALBERT B. DISS.

Witnesses:
A. P. THAYER,
T. B. MOSHER.